(12) United States Patent
Barr et al.

(10) Patent No.: US 9,085,985 B2
(45) Date of Patent: Jul. 21, 2015

(54) SCALLOPED SURFACE TURBINE STAGE

(75) Inventors: Brian Chandler Barr, Schenectady, NY (US); Brian David Keith, Cincinnati, OH (US); Gregory John Kajfasz, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 666 days.

(21) Appl. No.: 13/429,312

(22) Filed: Mar. 23, 2012

(65) Prior Publication Data
US 2013/0251520 A1    Sep. 26, 2013

(51) Int. Cl.
F01D 5/14    (2006.01)

(52) U.S. Cl.
CPC ............ *F01D 5/143* (2013.01); *F01D 5/145* (2013.01); *F01D 5/141* (2013.01); *F05D 2240/304* (2013.01); *F05D 2250/611* (2013.01); *F05D 2250/711* (2013.01); *F05D 2250/712* (2013.01); *Y02T 50/673* (2013.01)

(58) Field of Classification Search
CPC .......... F01D 5/141; F01D 5/143; F01D 5/145
USPC ............................ 416/193 A, 235, 236 R, 239
See application file for complete search history.

(56) References Cited

U.S. PATENT DOCUMENTS

| | | | |
|---|---|---|---|
| 6,017,186 A | 1/2000 | Hoeger et al. | |
| 6,283,713 B1 | 9/2001 | Harvey et al. | |
| 6,419,446 B1 | 7/2002 | Kvasnak et al. | |
| 7,887,297 B2 | 2/2011 | Allen-Bradley et al. | |
| 8,177,499 B2 * | 5/2012 | Iida | 415/208.1 |
| 8,439,643 B2 * | 5/2013 | Kuhne et al. | 416/193 A |
| 2007/0059177 A1* | 3/2007 | Harvey | 416/179 |
| 2007/0258810 A1* | 11/2007 | Aotsuka et al. | 415/206 |
| 2008/0267772 A1 | 10/2008 | Harvey et al. | |
| 2010/0080708 A1 | 4/2010 | Gupta et al. | |
| 2010/0143139 A1 | 6/2010 | Pandey et al. | |
| 2010/0158696 A1 | 6/2010 | Pandey et al. | |

(Continued)

FOREIGN PATENT DOCUMENTS

| | | |
|---|---|---|
| EP | 1760257 A1 | 3/2007 |
| EP | 2204535 A2 | 7/2010 |

OTHER PUBLICATIONS

Rose, Martin G., "Non-Axisymmetric Endwall Profiling in the HP NGV's of an Axial Flow Gas Turbine", Presented at the International Gas Turbine and Aeroengine Congress and Exposition, The Hague, Netherlands, Jun. 13-16, 1984 (8 pages).
EP Search Report and Written Opinion dated Feb. 13, 2014, issued in connection with corresponding EP Application No. 13160022.3.

(Continued)

*Primary Examiner* — Nathaniel Wiehe
*Assistant Examiner* — Woody A Lee, Jr.
(74) *Attorney, Agent, or Firm* — John P. Darling

(57) ABSTRACT

A turbine stage includes a row of airfoils joined to corresponding platforms to define flow passages therebetween. Each airfoil includes opposite pressure and suction sides and extends in chord between opposite leading and trailing edges. At least some of the platforms have a scalloped flow surface including a bulge adjoining the pressure side and a bowl adjoining the suction side, aft of the leading edge, of the respective airfoils. The bulge is configured having a maximum height located within its respective flow passage, and wherein the bulge decreases in height in a forward and aft direction and decreases in height laterally toward the pressure side of the airfoil and toward the bowl adjoining the suction side of a next adjacent airfoil.

21 Claims, 5 Drawing Sheets

(56) References Cited

U.S. PATENT DOCUMENTS

| | | |
|---|---|---|
| 2010/0166558 A1* | 7/2010 | Siden et al. ............... 416/193 R |
| 2010/0284818 A1 | 11/2010 | Sakamoto et al. |
| 2010/0303627 A1 | 12/2010 | Megerle et al. |
| 2013/0004331 A1 | 1/2013 | Beeck |
| 2013/0017095 A1* | 1/2013 | Lee et al. ..................... 416/239 |

OTHER PUBLICATIONS

Nicole V. Aunapu et al. "Secondary Flow Measurements in a Turbine Passage With Endwall Flow Modification". Journal of Turbomachinery—Oct. 2000—vol. 122, Issue 4, 651 (8 pages).

H. Sauer et al., "Reduction of Secondary Flow Losses in Turbine Cascades by Leading Edge Modifications at the Endwall". Journal of Turbomachinery—Apr. 2001—vol. 123, Issue 2, 207 (7 pages).

* cited by examiner

SCALLOPED SURFACE TURBINE STAGE

BACKGROUND

The present disclosure relates generally to gas turbine engines, any turbomachinery, and, more specifically, to turbines therein.

In a gas turbine engine air is pressurized in a compressor and mixed with fuel in a combustor for generating hot combustion gases. Turbine stages extract energy from the combustion gases to power the compressor, while also powering an upstream fan in a turbofan aircraft engine application, or powering an external drive shaft for marine and industrial applications.

A high pressure turbine (HPT) immediately follows the combustor and includes a stationary turbine nozzle which discharges combustion gases into a row of rotating first stage turbine rotor blades extending radially outwardly from a supporting rotor disk. The HPT may include one or more stages of rotor blades and corresponding turbine nozzles.

Following the HPT is a low pressure turbine (LPT) which typically includes multiple stages of rotor blades and corresponding turbine nozzles.

Each turbine nozzle includes a row of stator vanes having radially outer and inner endwalls in the form of arcuate bands which support the vanes. Correspondingly, the turbine rotor blades include airfoils integrally joined to radially inner endwalls or platforms supported in turn by corresponding dovetails which provide mounting of the individual blades in dovetail slots formed in the perimeter of the supporting rotor disk. An annular shroud surrounds the radially outer tips of the rotor airfoils in each turbine stage.

The stator vanes and rotor blades have corresponding airfoils including generally concave pressure sides and generally convex suction sides extending axially in chord between opposite leading and trailing edges. Adjacent vanes and adjacent blades form corresponding flow passages therebetween bound by the radially inner and outer endwalls.

During operation, combustion gases are discharged from the combustor and flow axially downstream as a core flow through the respective flow passages defined between the stator vanes and rotor blades. In addition, purge air from a purge cavity existing upstream of the airfoil leading edge is discharged as a purge flow that prevents ingesting hot core flow below the main gas path and potentially provides a cooling effect to the platforms and airfoils. The aerodynamic contours of the vanes and blades, and corresponding flow passages therebetween, are precisely configured for maximizing energy extraction from the combustion gases which in turn rotate the rotor from which the blades extend.

The complex three-dimensional (3D) configuration of the vane and blade airfoils is tailored for maximizing efficiency of operation, and varies radially in span along the airfoils as well as axially along the chords of the airfoils between the leading and trailing edges. Accordingly, the velocity and pressure distributions of the combustion gases and purge air over the airfoil surfaces as well as within the corresponding flow passages also vary.

Undesirable pressure losses in the combustion gas flowpaths therefore correspond with undesirable reduction in turbine aerodynamics and overall turbine efficiency. For example, the combustion gases enter the corresponding rows of vanes and blades in the flow passages therebetween and are necessarily split at the respective leading edges of the airfoils.

The locus of stagnation points of the incident combustion gases extends along the leading edge of each airfoil, and corresponding boundary layers are formed along the pressure and suction sides of each airfoil, as well as along each radially outer and inner endwall which collectively bound the four sides of each flow passage. In the boundary layers, the local velocity of the combustion gases varies from zero along the endwalls and airfoil surfaces to the unrestrained velocity in the combustion gases where the boundary layers terminate.

Turbine losses can occur from a variety of sources, for example, secondary flows, shock loss mechanism and mixing losses. At the leading edges of the turbine blades, secondary flow structures result in mixing losses. One common source of the turbine pressure losses is the formation of horseshoe vortices generated as the combustion gases are split in their travel around the airfoil leading edges. These secondary flow structures result in high heat concentrations in the area where the turbine blade join the blade endwall structure. A total pressure gradient is affected in the boundary layer flow at the junction of the leading edge and endwalls of the airfoil. This pressure gradient at the airfoil leading edges forms a pair of counterrotating horseshoe vortices which travel downstream on the opposite sides of each airfoil near the endwall. The two vortices travel aft along the opposite pressure and suction sides of each airfoil and behave differently due to the different pressure and velocity distributions therealong. For example, computational analysis indicates that the suction side vortex migrates away from the endwall toward the airfoil trailing edge and then interacts following the airfoil trailing edge with the pressure side vortex flowing aft thereto. Since the horseshoe vortices are formed at the junctions of turbine rotor blades and their integral root platforms, as well at the junctions of nozzle stator vanes and their outer and inner bands, corresponding losses in turbine efficiency are created, as well as additional heating of the corresponding endwall components.

The interaction of the pressure and suction side vortices typically occurs near the midspan region of the airfoils and creates total pressure loss and a corresponding reduction in turbine efficiency. Cross-passage pressure gradients between the pressure and suction side of the blade give rise to additional secondary flow structures and vortices, such as corner vortices that alter the desired aerodynamics of the blade, giving rise to losses in turbine efficiency as well as possible additional heating of the endwalls and even the blade.

Corner vortices are initiated at a corner junction between the airfoil and the endwall platform. Corner vortices may result in over-turning of air through the bladerow. The corner vortex itself does not produce the overturning, but the overturning is an artifact of the mechanism to reduce that vortex. Downstream airfoils must deal with the over-turned air off upstream airfoils. Left alone, the overturning will result in increased losses.

Accordingly, it is desired to provide an improved turbine stage for reducing horseshoe and secondary flow vortex affects, as well as increasing aerodynamic loading while controlling heat distribution and efficiency or improving efficiency and thermal loading while maintaining aerodynamic loading and/or torque production.

BRIEF DESCRIPTION

In accordance with one exemplary embodiment, disclosed is a turbine stage including a row of airfoils integrally joined to corresponding platforms and spaced laterally apart to define respective flow passages therebetween for channeling gases. Each flow passage having a width and each of the airfoils including a concave pressure side and a laterally opposite convex suction side extending in chord between opposite leading and trailing edges. At least some of the platforms having a scalloped flow surface including a bulge adjoining the pressure side and a bowl adjoining the suction side aft of the leading edge of the respective airfoils. The bulge is configured having a maximum height located within its respective flow passage, and wherein the bulge decreases in height in a forward and aft direction and decreases in height laterally toward the pressure side of the airfoil and toward the bowl adjoining the suction side of a next adjacent airfoil.

In accordance with another exemplary embodiment, disclosed is a turbine stage including a row of airfoils integrally joined to corresponding platforms and spaced laterally apart to define respective flow passages therebetween for channeling gases. Each flow passage having a defined width and each of the airfoils including a concave pressure side and a laterally opposite convex suction side extending in chord between opposite leading and trailing edges. At least some of the platforms having a scalloped flow surface including a bulge extending along a portion of the airfoils and coupled to the at least some platforms. The bulge adjoining the pressure side of each respective airfoil with the respective platforms and a bowl extending along a portion of the airfoils and coupled to the at least some platforms. The bowl adjoining the suction side aft of the leading edge of each respective airfoil with the respective platforms. The bulge is configured having a maximum height located within its respective flow passage, and wherein the bulge decreases in height in a forward and aft direction and decreases in height laterally toward the pressure side of the airfoil and toward the bowl adjoining the suction side of a next adjacent airfoil.

In accordance with yet another exemplary embodiment, disclosed is a turbine blade including an airfoil integrally joined to a platform, and having laterally opposite pressure and suction sides extending in chord between axially opposite leading and trailing edges. The platform including a bulge adjoining the pressure side, a first bowl portion adjoining the suction side aft of the leading edge, and a second bowl portion integrally formed with the bulge on the pressure side and being complementary with the first bowl portion to define therewith on an adjacent blade, a collective bowl. The bulge is configured having a maximum height located within its respective flow passage, and wherein the bulge decreases in height in a forward and aft direction and decreases in height laterally toward the pressure side of the airfoil and toward the bowl adjoining the suction side of a next adjacent airfoil.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

DRAWINGS

The above and other features, aspects, and advantages of the present disclosure will become better understood when the following detailed description is read with reference to the accompanying drawings in which like characters represent like parts throughout the drawings, wherein.

DETAILED DESCRIPTION

Figure 1:
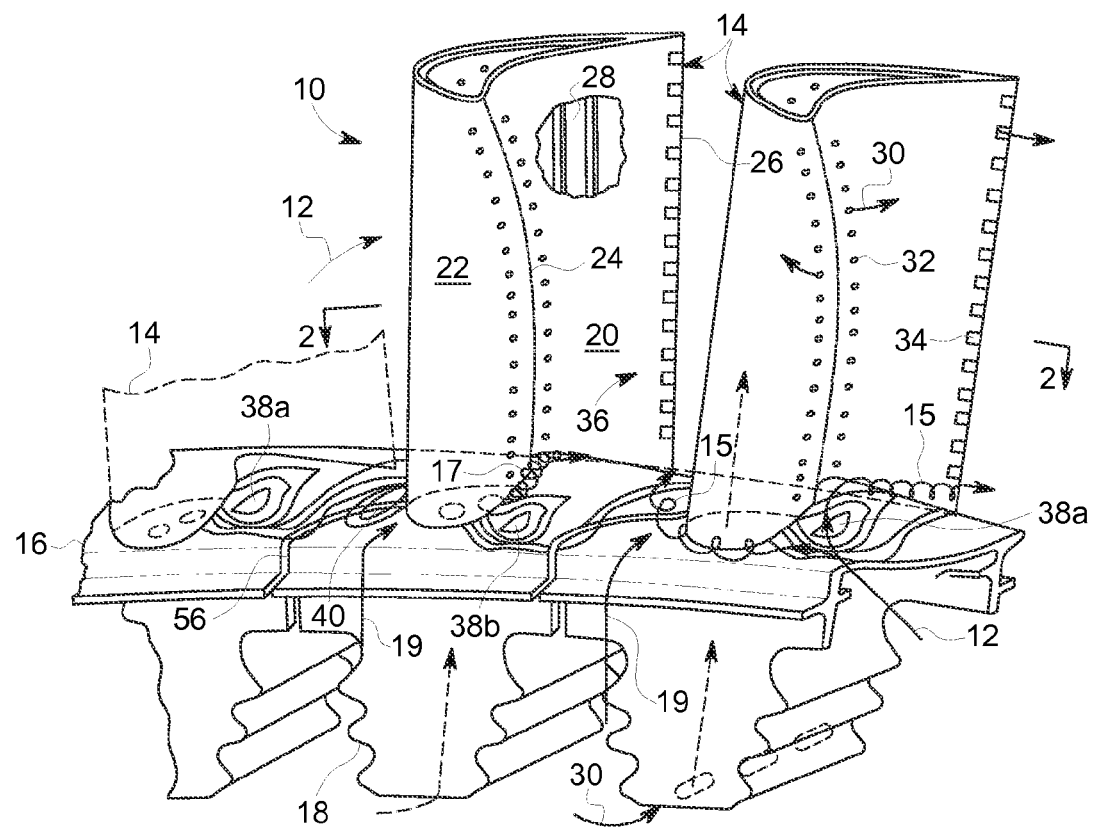
FIG. 1 is an isometric view forward-facing-aft of exemplary turbine blades in a turbine stage row according to an embodiment.

Referring to the drawings wherein identical reference numerals denote the same elements throughout the various views, illustrated in FIG. 1 are two exemplary first stage turbine rotor blades 10 which circumferentially adjoin each other in a full row thereof in a corresponding turbine stage of a gas turbine engine. As indicated above, combustion gases 12 are formed in a conventional combustor (not shown) and discharged in the axial downstream direction through the row of turbine blades 10 as a core flow 13. The turbine blades 10 extract energy from the combustion gases 12 for powering a supporting rotor disk (not shown) on which the blades 10 are mounted.

The turbine stage includes a complete row of the blades 10, with each blade 10 having a corresponding airfoil 14 integrally joined at a root end to a corresponding radially inner endwall or platform 16. Each platform 16 is in turn integrally joined to a corresponding axial-entry dovetail 18 conventionally configured for supporting the corresponding turbine blade 10 in the perimeter of the rotor disk.

Each airfoil 14 includes a generally concave pressure side 20 and a circumferentially or laterally opposite, generally convex suction side 22 extending axially in chord between opposite leading and trailing edges 24, 26, respectively. The two edges 24, 26 extend radially in span from root to tip of the airfoil 14.

Figure 2:
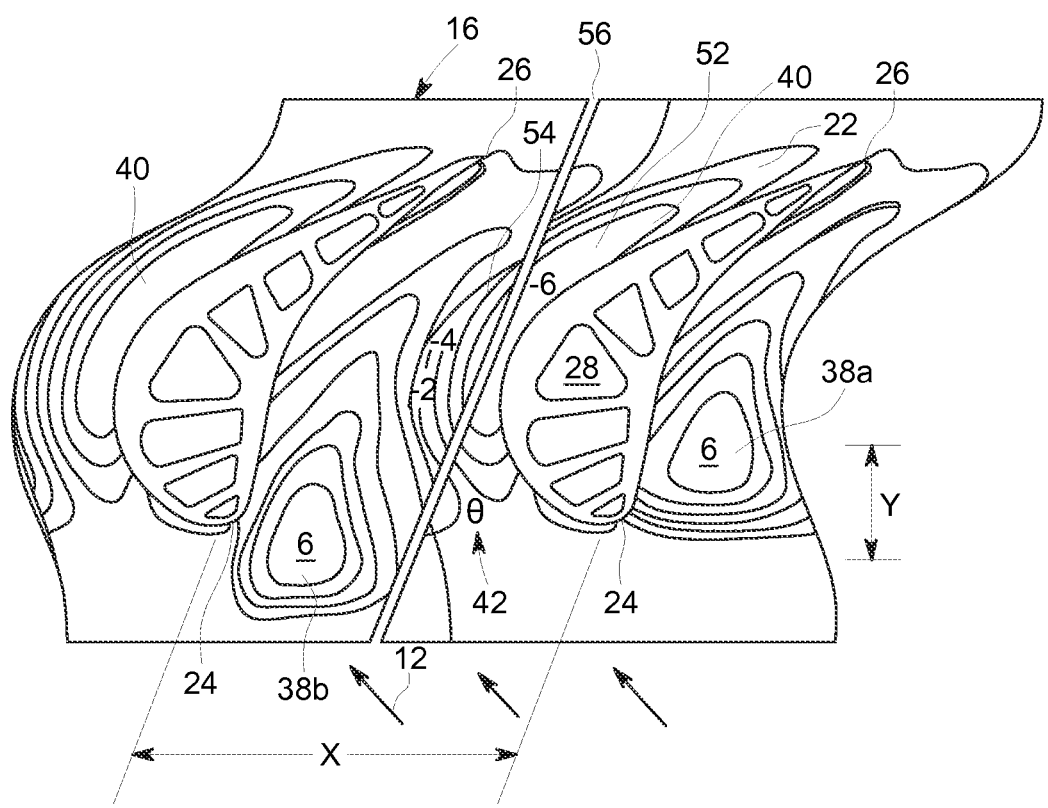
FIG. 2 is a planiform sectional view through the blades illustrated in FIG. 1 and taken along line 2-2 of FIG. 1 according to an embodiment.
Figure 3:
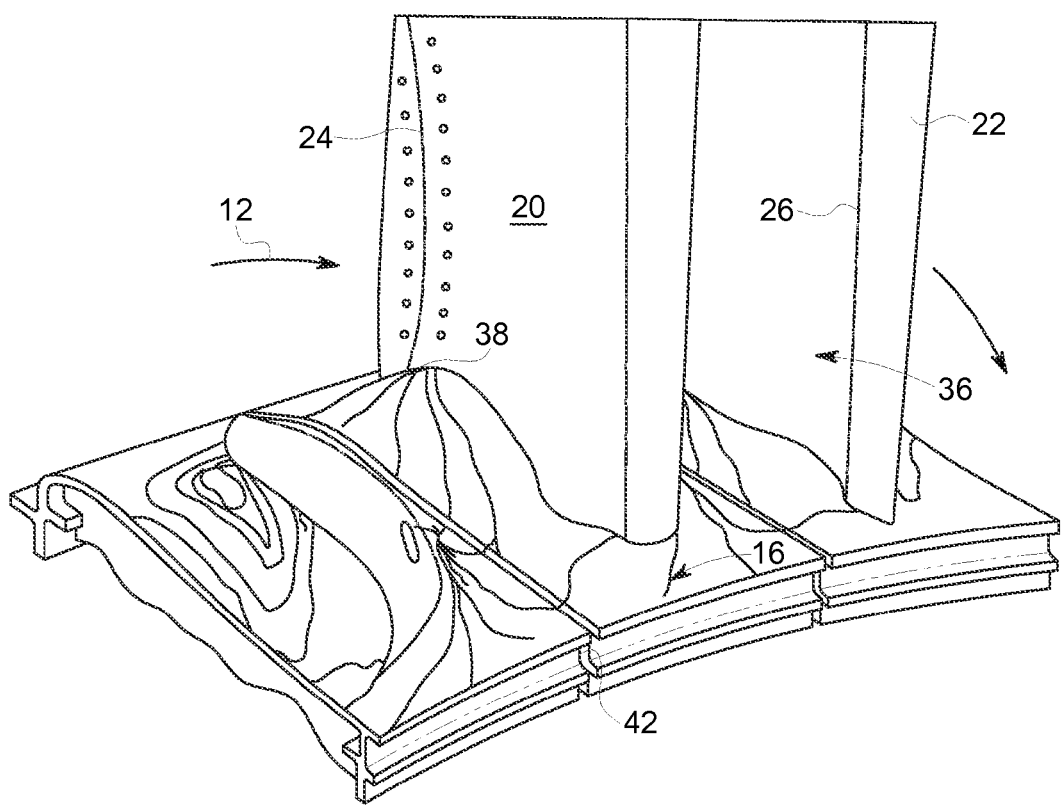
FIG. 3 is an isometric view aft-facing-forward of the blades illustrated in FIG. 1 according to an embodiment.

As shown generally in FIG. 1, in a planiform sectional view in FIG. 2 and in an isometric view aft-facing-forward in FIG. 3, each airfoil 14 may be hollow and include an internal cooling circuit 28 bound by the opposite pressure and suction sides 20, 22. The cooling circuit 28 may have any conventional configuration and includes inlet channels extending through the platform 16 and dovetail 18 for receiving cooling air 30 bled from the compressor of the engine (not shown).

The cooling air 30 is typically discharged from each airfoil 14 through several rows of film cooling holes 32 located where desired on the pressure and suction sides 20, 22 of the airfoil 14, and typically concentrated near the leading edge 24 thereof. Each airfoil 14 typically also includes a row of trailing edge cooling holes 34 which emerge through the pressure side 20 of the airfoil 14 just before the thin trailing edge 26 thereof.

The exemplary turbine blades 10 illustrated in FIGS. 1 and 2 may have any conventional configuration of the airfoil 14, platform 16, and dovetail 18 for extracting energy from the combustion gases 12 during operation. As indicated above, the platform 16 is integrally joined to the root end of the airfoil 14 and defines the radially inner flow boundary for the combustion gases 12, or the core flow 13.

The blades 10 are mounted in a row around the perimeter of the rotor disk, with the adjacent airfoils 14 being spaced circumferentially or laterally apart to define therebetween flow passages 36 having a passage width "x" defined between adjacent leading edges 24 (as best illustrated in FIG. 2) for channeling the combustion gases 12 and a purge flow of purge air from a purge flow cavity (not shown) axially in the downstream direction during operation.

Each inter-airfoil flow passage 36 in the turbine stage illustrated in FIGS. 1-3 is therefore defined and bounded by the pressure side 20 of one airfoil 14, the suction side 22 of the next adjacent airfoil 14, the corresponding pressure and suction side portions 20, 22 of the adjacent platforms 16, and the radially outer turbine shroud (not shown) which surrounds the radially outer tip ends of the airfoils 14 in the complete row of turbine blades 10.

As indicated above in the Background section, the combustion gases 12 flow through the corresponding flow passages 36 as the core flow 13 during operation and are necessarily split by the individual airfoils 14. The high velocity combustion gases are circumferentially split at the corresponding airfoil leading edges 24 with a stagnation pressure thereat, and with the formation of corresponding boundary layers along the opposite pressure and suction sides 20, 22 of the airfoil 14. Furthermore, the combustion gases 12 also form a boundary layer along the individual blade platforms 16 as the gases are split around the airfoil leading edge 24 at its juncture with the platform 16.

The split core flow 13 along the blade platforms 16 results in a pair of counterrotating horseshoe vortices 15 which flow axially downstream through the flow passages 36 along the opposite pressure and suction sides 20, 22 of each airfoil 14. These horseshoe vortices 15 create turbulence in the boundary layers, and migrate radially outwardly toward the midspan regions of the airfoils 14 and create losses of total pressure and reduce turbine efficiency. The horseshoe vortices 15 are energized by the presence of the purge cavity and a purge flow 19 which modifies the cross-passage static pressure gradient. In addition, corner vortices 17 initiated at a corner junction between each of the airfoil 14 and the platform 16, result in over-turning of air through corresponding flow passages 26. As indicated above in the Background section, the downstream airfoils 14 must respond to the over-turned air off upstream airfoils 14. Left alone, the overturning air will result in increased pressure losses.

The exemplary turbine rotor stage illustrated in FIGS. 1-3 may have any conventional configuration such as that specifically designed as a first stage HPT rotor for extracting energy from the combustion gases 12 to power the compressor in a typical manner. As illustrated, the incident combustion gases 12 are split along the airfoil leading edges 24 to flow axially through the corresponding flow passages 36 as the core flow 13 in the downstream direction.

The concave profile of the pressure sides 20 and the convex profile of the suction sides 22 are specifically configured for effecting different velocity and pressure distributions for maximizing extraction of energy from the combustion gases 12. The platforms 16 define radially inner endwalls which bound the combustion gases 12, with the gases also being bound radially outwardly by a surrounding turbine shroud (not shown).

In the illustrated configuration, the incident combustion gases 12 at the junction of the platforms 16 and leading edges 24 are subject to the horseshoe vortices 15 and the corner vortices 17, fueled by modifying of the cross-passage static pressure gradient by the purge flow 19. The combustion gases 12 progress through the flow passages 36 along the opposite pressure 20 and suction sides 22 of the airfoils 14. As indicated above, these vortices create turbulence and overturning, decrease the aerodynamic efficiency of the turbine stage, and increase the heat transfer heating of the platforms 16. In an embodiment, an upstream airfoil 14 may include endwall contouring to reduce the strength of the corner vortices 17, but results in increased over-turning of the air, through the bladerow than an airfoil without endwall contouring would produce. The corner vortices 17 do not produce the overturning, but is a result of the end wall contouring to reduce the corner vortices 17. The downstream airfoil 14, must respond to the over-turned air off the upstream airfoil 14 to prevent pressure losses from occurring. Accordingly, additional end wall contouring on the downstream vane enables it to respond to the overturning air from the upstream airfoil 14 and work as a system to produce optimum performance.

The platforms 16 illustrated initially in FIGS. 1-3 are specifically configured with scalloped or contoured flow surfaces that minimize or reduce the strength of secondary flows by reducing the strength of the corner vortices 17, which induce the overturning, and reducing cross-passage pressure gradients. A first exemplary configuration of the scalloped platforms 16 is shown generally in FIG. 1, with isoclines of common elevation from a nominally axisymmetric platform. FIG. 2 illustrates in more detail the isoclines of FIG. 1 in planiform view. An alternate configuration of the scalloped platforms 16 is shown generally in FIG. 4, with isoclines of common elevation from a nominally axisymmetric platform shown in FIG. 5.

Referring more specifically to FIGS. 1-3, modern computational fluid dynamics have been used to study and define the specific 3D contours of the platforms 16 for minimizing secondary flows, while correspondingly improving turbine aerodynamic efficiency. The scalloped platforms 16 illustrated in FIGS. 1-3 include a scallop or a bulge 38 adjoining the pressure side 20 of the airfoil 14. The bulge 38 is configured rising upwardly (+) into the flow passage 36 relative to the nominal axisymmetric reference surface ($\theta$). Cooperating with the local bulge 38 is an integral gouge or bowl 40 that has a lower elevation (−) relative to the nominal axisymmetric platform surface to form a depression therein. In an embodiment, the bulge 38 is further configured having a maximum height located within its respective flow passage 36, and wherein the bulge 38 decreases in height in a forward and aft direction and decreases in height laterally height laterally toward the pressure side 20 of the airfoil 14 and toward the bowl 40 adjoining the suction side 22 of a next adjacent airfoil 14.

It is noted that the specific sizes and spacing of the airfoils 14 are selected for a particular engine design and mass flow rate therethrough. The arcuate sidewalls of the airfoils 14 typically define the flow passages 36 circumferentially therebetween that converge in the axial downstream direction from the leading edges 24 to the trailing edges 26.

The trailing edge 26 of one airfoil 14 typically forms a throat of minimum flow area along its perpendicular intersection near the midchord of the suction side 22 of an adjacent airfoil 14. The flow area of the flow passage 36, including the minimum flow area of the throat thereof, are preselected for a given engine application and therefore are controlled by both the radially inner endwall defined by platform 16, as well as the radially outer endwalls defined by the turbine shroud (not illustrated).

The reference platform surface may therefore be conveniently defined as the conventional axisymmetrical surface defined by circular arcs around the circumference of the turbine stage, and may be used as the zero reference elevation illustrated in FIG. 2. The bulge 38 therefore rises outwardly in elevation (+) from the zero reference plane or surface, whereas the bowl 40 extends in depth (−) below the reference plane or surface. In this way, the bulge and bowl may complement and offset each other for maintaining the desired or given flow area for each flow passage.

The bulges 38 and bowls 40 illustrated in FIGS. 1-3 are preferentially located specifically for reducing the strength of the horseshoe vortices, minimizing losses due to secondary flows, mitigating shock interactions and modifying the cross passage static pressure gradient which energizes the horseshoe vortices and corner vortices, all improving turbine aerodynamic efficiency. In the illustrated embodiment, the bulge 38 is configured to directly adjoin the airfoil pressure side 20 at a position downstream, or aft, of the leading edge 24, as best illustrated in FIGS. 1 and 2 and referenced 38a. In an alternate embodiment, the bulge 38 is configured to directly adjoin the airfoil pressure side 20 at a position upstream, or forward, of the leading edge 24, as best illustrated in FIGS. 1 and 2 and referenced 38b. As previously described, in either instance, the bulge 38 is configured having a maximum height located within its respective flow passage 36. Accordingly, the bulge 38 decreases in height in a forward and aft direction and decreases in height laterally between the pressure side 20 and the bowl 40 adjoining the suction side 22 of the respective airfoil 14. The bowl 40 is configured to adjoin the airfoil suction side 22 at a position downstream, or aft, of the leading edge 24.

By configuring the bulge 38 as described, the incoming corner vortices and horseshoe vortices can be offset by local streamline curvature of the combustion gases around the bulge 38 and overturning air as a result of the corner vortices may be minimized. Correspondingly, the radially outward migration of the horseshoe vortices can be interrupted early in the flow passage 36 by the bowl 40.

The bulge 38 and the bowl 40 are effective for reducing flow acceleration of the combustion gases 12, increasing local static pressure, altering gradients in gas pressure, reducing vortex stretching, reducing the strength of the corner vortices 17 (which induce overturning) and reducing reorientation of the horseshoe vortices as they travel downstream through the flow passages 36. These combined effects limit the ability of the horseshoe vortices to migrate radially outwardly along the airfoil suction side 22, reduce vortex strength and minimize overturning, thereby increasing overall efficiency of the turbine stage.

As indicated above, FIG. 2 is a planiform view of the platforms 16 with isoclines of equal elevation relative to the reference zero surface to emphasize the 3D varying contour of the platforms 16 between the forward and aft ends of each platform 16 and circumferentially or laterally between adjacent airfoils 14. As further indicated above, FIG. 5 is a similar planiform view of the platforms 16 with isoclines of equal elevation relative to the reference zero surface to emphasize the 3D varying contour of the platforms 16 between the forward and aft ends of each platform 16 and circumferentially or laterally between adjacent airfoils 14 according to another embodiment.

Since the platforms 16 extend on both sides of each airfoil 14, typically with small extensions forward of the leading edge 24 and aft of the trailing edge 26, the elevated bulge 38 and the depressed bowl 40 will smoothly transition with each other in a preferred manner to reduce the strength of the horseshoe vortices and corner vortices and respond to overturning air flow. The bulge 38 decreases in height or elevation as it extends aft and laterally along the pressure side 20 to join the bowl 40 along the suction side 22. In an embodiment, the bowl 40 extends along the suction side 22 between the leading and trailing edges 24, 26, commencing, for example, aft of the leading edge 24 and terminating proximate the trailing edge 26.

FIGS. 1-5 illustrate embodiments of the transition between the elevated bulge 38 on the airfoil pressure side 20, and the bowl 40 on the airfoil suction side 22. More specifically, in an embodiment illustrated in FIGS. 1-3, the bulge 38 is configured with maximum height on the pressure side 20 located within the flow passage 36, and decreases rapidly in height in a forward direction and decreases in height gradually, in comparison, in an aft direction along the longer extent of the pressure side 20 to the trailing edge 26. The gradual transition of the bulge 38 to the trailing edge 26 forms an extension of the bulge 38 that decreases in elevation. In addition, the bulge 38 decreases in height laterally from the maximum height located within the flow passage 36 toward the pressure side 20 of the airfoil in one direction and toward the bowl 40 in the opposed direction. FIG. 2 illustrates in an embodiment the bulge 38 decreases continuously in height along the pressure side 20 from its peak height within the flow passage 36 to the trailing edge 26. In addition, the bulge 38 decreases in height laterally or circumferentially toward the pressure side 20 of one airfoil 14 and toward the suction side 22 of the next adjacent airfoil 14. As best illustrated in FIG. 2, the bulges 38a and 38b are each configured having a maximum elevation a distance "Y" lying forward or aft of the leading edge 24, wherein "Y" spans from about −20 percent to about 30 percent of the chord length of the airfoil 14.

Figure 4:
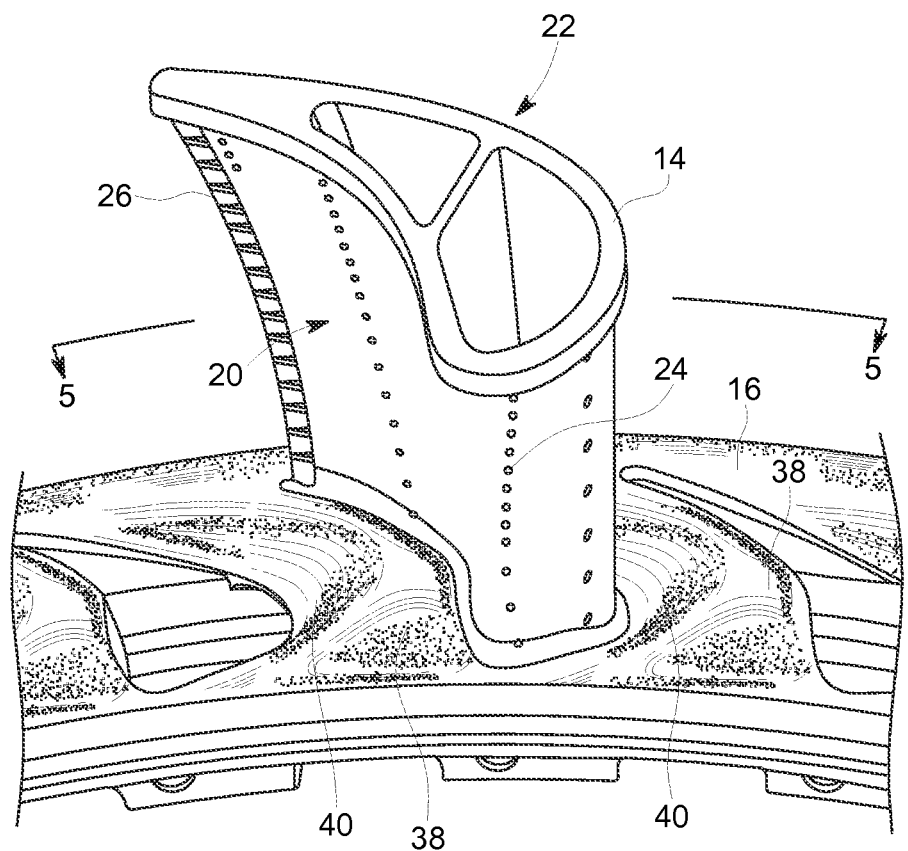
FIG. 4 is an isometric view forward-facing-aft of an exemplary turbine blade in a turbine stage row according to an embodiment.
Figure 5:
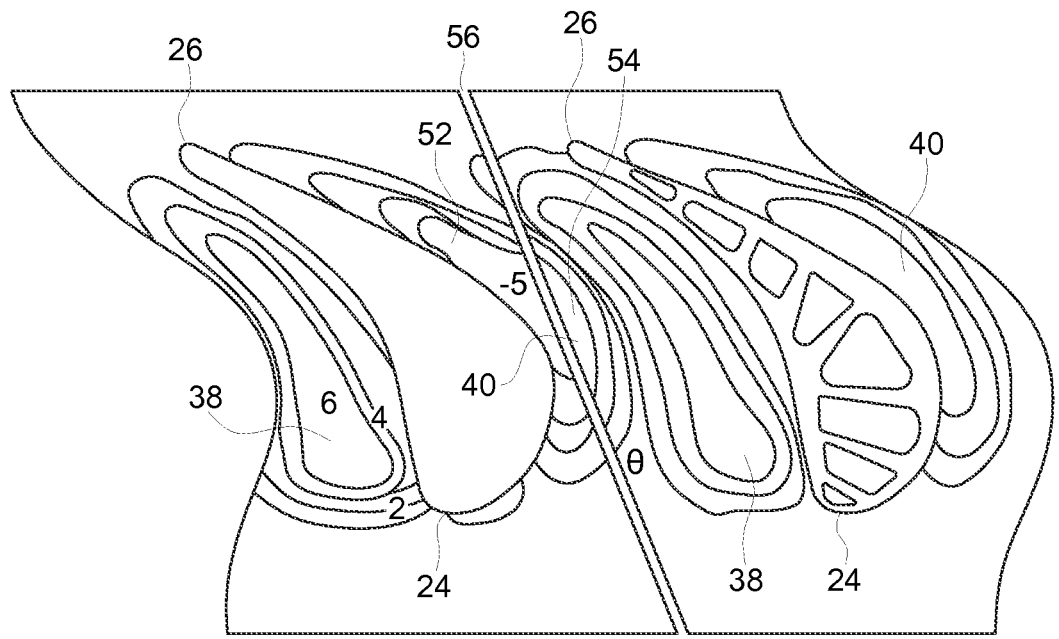
FIG. 5 is a planiform sectional view through the blades illustrated in FIG. 3 and taken along line 5-5 of FIG. 4 according to an embodiment.

FIGS. 4 and 5 best illustrate an alternate embodiment wherein the bulge 38 is configured having a maximum height at the pressure side and decreasing rapidly in height in a forward direction and gradually decreasing in height in an aft direction along a substantial extent of the pressure side 20 and toward the trailing edge 26, so as to substantially maintain its height in an aft direction along a greater extent of the pressure side 20 than the embodiment illustrated in FIG. 2, and decreasing in height rapidly in an aft direction, at the trailing edge 26. In addition, similar to the previously described embodiment, the bulge 38 decreases in height laterally or circumferentially from the pressure side 20 of one airfoil 14 toward the suction side 22 of the next adjacent airfoil 14.

FIGS. 1-5 best illustrate that the bowl 40 is configured with maximum depth at the suction side 22 aft of the leading edge. In an embodiment, the bowl 40 has a maximum depth at the suction side 22 near the maximum lateral thickness of the airfoil in its hump region, and blends with the elevated bulge 38 rapidly in the short transition region therebetween, and gradually, in comparison along the longer extent of the suction side aft to the trailing edge 26. Both the bulge 38 and bowl 40 blend together and terminate laterally or circumferentially in the corresponding flow passages 36 between the trailing edges 26 at the zero reference elevation.

Figure 6:
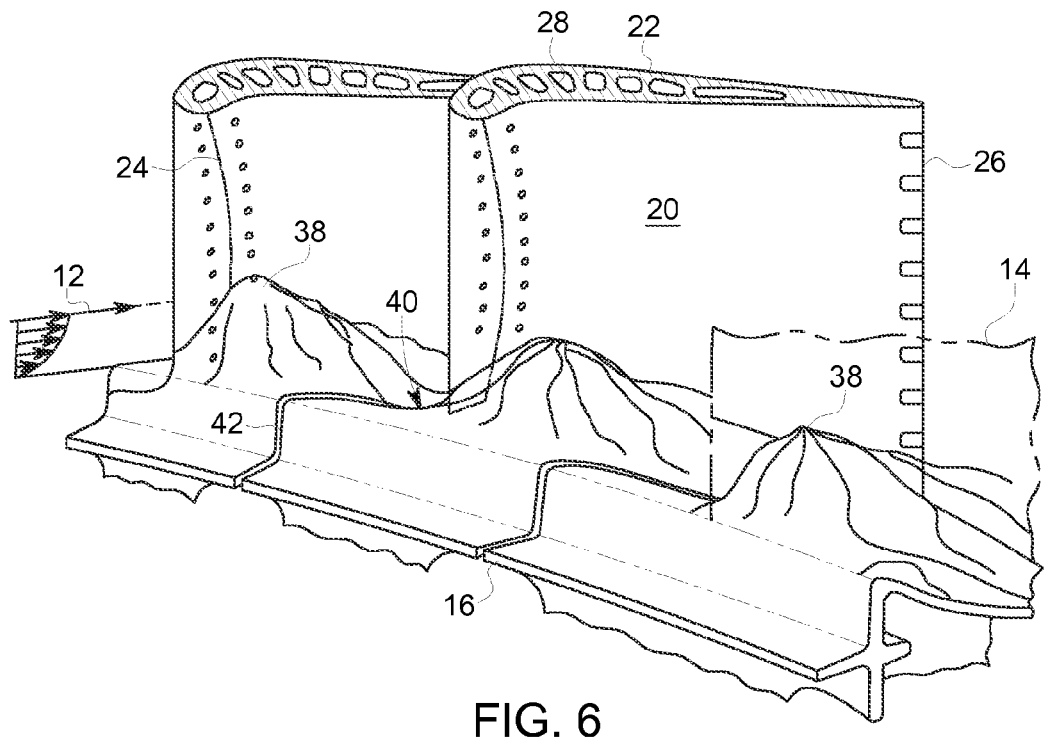
FIG. 6 is an isometric view of the pressure side of the blades illustrated in FIG. 1 including the scalloped platforms thereof, according to an embodiment.

FIG. 6 illustrates schematically the incident combustion gases 12 which have a corresponding boundary layer in which the velocity of the combustion gases 12 is zero directly at the flow surface of the platform 16 and increases rapidly to the freestream velocity. The thickness of the boundary layer ranges from about two percent to about 15 percent of the radial height or span of the airfoil 14. The magnitude of the platform scalloping, encompassing the bulge 38 and the bowl 40, can be relatively small to specifically minimize the strength of the horseshoe vortices and overturning of the airflow between airfoils, thereby increasing turbine aerodynamic efficiency.

The bulge 38 as shown in FIGS. 1-5 preferably has a maximum height which is generally equal to the thickness of the incoming boundary layer of combustion gases 12 as they are first channeled over the platforms 16. Correspondingly, the bowl 40 has a maximum depth less than about the maximum height of the bulge 38. In FIGS. 2 and 5, the isoclines have been labeled with arbitrary numbers from the reference zero surfaces, with the bulge 38 increasing in height to an exemplary magnitude of about +6, with the bowl 40 increasing in depth to a maximum depth of about −5.

These exemplary numbers are merely representative of the changing contour of the scalloped platform 16. The actual magnitudes of the bulge 38 and the bowl 40 will be determined for each particular design. In an embodiment, the maximum depth of the bowl ranges from about 37 to about 64 mils and the height of the bulge 38 ranges from about 40 mils (1 mm) to about 450 mils (11.4 mm) for turbine airfoils ranging in height from 5 cm to about 7.5 cm.

FIGS. 1-5 also illustrate embodiments where the bulge 38 is generally semi-spherical laterally, and generally convex both forwardly toward the leading edge 24 and in the aft direction towards the trailing edge 26. In the axial plane extending circumferentially between the leading edges 24 of the airfoil row, the bulges 38 are conical in section between the convex forward and aft portions thereof in the exemplary embodiments for which computational flow analysis predicts a significant reduction in vortex strength and migration. The exemplary bowl 40 illustrated in FIGS. 1-5 is generally concave laterally from its origin of maximum depth which is positioned directly against the suction side of each airfoil 14. The bowl 40, like the bulge 38, is generally semi-spherical, but concave centering on the airfoil suction side 22.

The scalloped platform 16, including the bulge 38 and the bowl 40, should preferably join the root end of the airfoil 14 at a suitably small fillet of conventional size up to about 50 mils (1.3 mm) for example. In a further embodiment the fillet can be from about 0.1 to about 50% of the span of the blade. It is contemplated that the fillet should be optimized for the design, performance and structural loads experienced. This is within the knowledge of those skilled in the art.

The bulges 38 and the bowls 40 may begin or commence either aft of the leading edges 24 or forward the leading edges 25 and form or define laterally therebetween an axially arcuate flute or channel 42 along the zero elevation contour therebetween. The fluted channel 42 extends axially along the individual platform 16 between adjacent airfoils 14 commencing near the leading edges 24 and terminating at the trailing edges 26, or aft thereof as desired within the available surface space of the platforms 16.

The zero elevation contours may be a single line, or a land of suitable width between the bulge 38 and the bowl 40. In the land embodiment, the convex bulge 38 preferably blends with one side of the land through an inflection region having a concave transition with the land. The concave bowl 40 preferably blends with the other side of the land through another inflection region having a convex transition with the land.

Since the exemplary turbine stage illustrated in the Figures is configured as a turbine rotor stage, the individual platforms 16 are integrally joined to the root of each airfoil 14, with a corresponding dovetail 18 (FIG. 1) therebelow, with the platforms 16 collectively defining the radially inner boundary or endwalls for the combustion gas flow 12. Each platform 16 therefore adjoins an adjacent platform at an axial splitline 56, with the splitlines 56 bifurcating or splitting the inter-airfoil bowls 48 axially between the leading and trailing edges 24, 26 in complementary first bowl portions 52 and second bowl portions 54. This is best illustrated in FIGS. 2 and 5 in which the platform 16 has portions extending from the opposite pressure and suction sides 20, 22 of the airfoil 14. The bulge 38 is disposed primarily on the pressure side 20 of the platform 16. The suction side portion 22 of the platform 16 includes the first bowl portion 52 extending over most of the platform 16 surface.

However, the first bowl portion 52 is interrupted by the axial splitline 56 from the complementary second bowl portion 54 integrally formed with the bulge 38 on the pressure side 20 of the next adjacent platform 16. The first bowl portion 52 on one platform 16 is complementary with the second bowl portion 54 on the next adjacent platform 16 and collectively define a single bowl 40 extending from the suction side 22 of one airfoil 14 to the bulge 38 and its ridge along the pressure side 20 of the next adjacent airfoil 14.

The axial splitlines 56 interrupt the circumferential continuity of the entire turbine row stage, and permit the individual fabrication of each turbine blade in a conventional manner, such as by casting. The overall configuration of the turbine blade including its airfoil 14, platform 16 and dovetail 18 may be cast in a conventional manner, and the scalloped features thereof may also be integrally cast therein where feasible.

Alternatively, the platforms 16 may be cast with nominal axisymmetric platforms with locally elevated material for the bulge 38, which may then be machined using conventional electrical discharge machining (EDM) or electrochemical machining (ECM) for forming the 3D contour of the scalloped platform 16, including the final contours of the bulge 38 and the bowl 40.

Since the gradient lines of the bowl portions 48 on the suction side 22 of the airfoil 14 as illustrated in FIGS. 2 and 4 run generally circumferentially, the 3D bowl contours may be altered to 2D contours varying linearly in the circumferential direction for more readily permitting casting thereof using conventional casting die halves, if desired.

A significant feature of the scalloped platforms illustrated in FIGS. 1-5 is the locally elevated bulge 38 provided having a maximum height falling within the flow passage 36, and wherein the maximum depth is not adjacent or adjoining the pressure side of the airfoil 14 for responding to the overturning of air from an upstream airfoil and weakening the horseshow vortices. Preferably each bulge 38 extends in most part from either forward or aft of the leading edge 24 along the pressure side 20 to the trailing edge 26, and blending laterally with the corresponding bowl 40 that extends over the large majority of the suction side 22.

In an embodiment, the bulge 38 is centered on the natural stagnation point of the incident combustion gases 12 aft of the leading edge 24. In an alternate embodiment, the bulge 38 is centered on the natural stagnation point of the incident combustion gases 12 forward of the leading edge 24. The contour of each airfoil, and twist or angular position thereof, are selected for each design application so that the leading edge 22 of the airfoil first receives the combustion gases typically at an oblique angle from an axial centerline axis, with the combustion gases 12 turning as they flow through the curved flow passages 36 between the airfoils 14. The natural stagnation point of the incoming combustion gases 12 may be aligned closely adjacent thereto the leading edge 24 on either the pressure 20 or suction sides 22 of the airfoil 14, and forward or aft of the leading edge.

Accordingly, for each particular design application, the bulge 38 may be centered at the natural stagnation. The so positioned bulge 38 and complementary bowl 40 are specifically introduced in the radially inner platforms 16 of the turbine rotor blades to cooperate with each other with synergy for reducing the strength of the turning over of air therebetween and horseshoe vortices that stretch and wrap around the leading edge 24 and flow downstream through the flow passages 36.

The scalloped platform 16 reduces the local flow acceleration and changes the pressure gradient that drives the horseshoe vortices 15 and secondary flow structures 15 towards the airfoil suction side 22. The combination of reduced vortex strength and altered pressure gradients reduce migration of the vortices 15 and 17 towards the airfoil suction side 22, and reduces the tendency for the vortices to migrate along the airfoil span for correspondingly reducing pressure losses in turbine efficiency. It is also noted that in an embodiment, the airfoils 14 can be symmetrical airfoils and are not limited to having concave and convex surfaces as shown in the figures.

Figure 7:
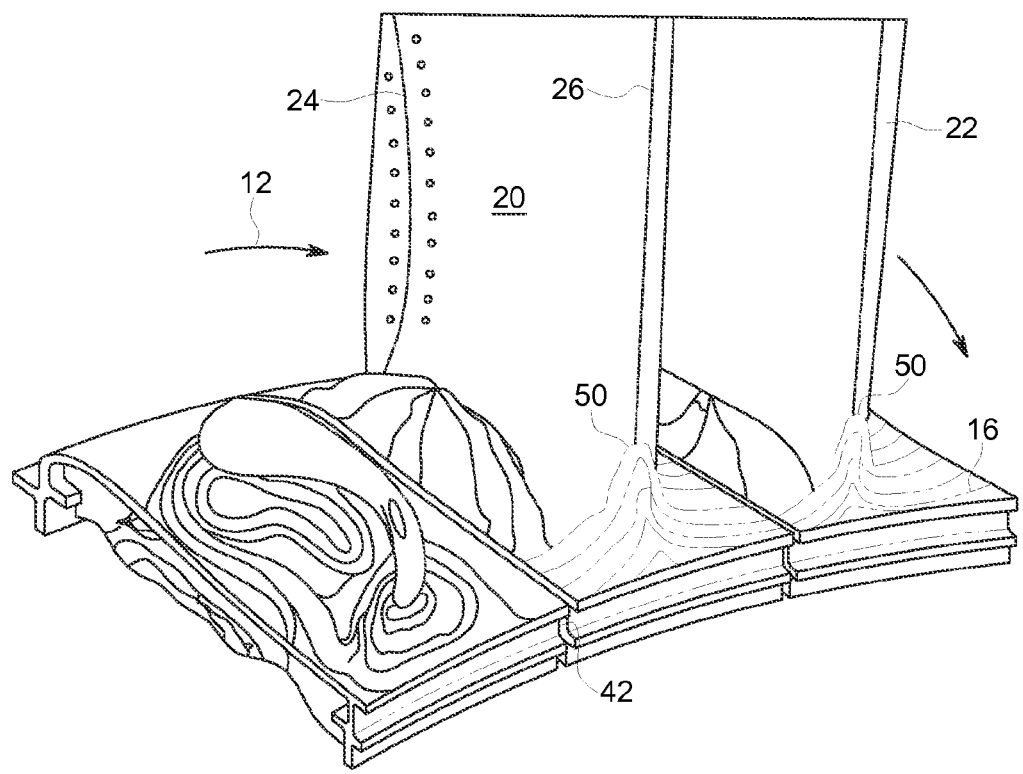
FIG. 7 an isometric view aft-facing-forward of the blades according to another embodiment.

Another exemplary embodiment is depicted in FIG. 7 that is similar to the embodiments shown in FIGS. 1-6, discussed above. However, in the illustrated FIG. 7, a trailing edge ridge 50 is positioned at the trailing edge 26 of the airfoils 14. Similar to the bulge 38 discussed previously, the trailing edge ridge 50 is a bulged or scalloped platform which rises upwardly (+) into the flow passage 36 from the platforms 16 which define the radially inner endwalls.

In the embodiment depicted in FIG. 7 the trailing edge ridge 50 is shown in a configuration having the bulge 38 and the bowl 40. The present disclosure is not limited in this regard as the combination of scalloped surfaces employed are selected for particular operational and design parameters, such as mass flow rate, etc.

Similar to the discussion regarding the bulge 38, the trailing edge ridge 50 rises into the flow passage 36. As shown by the contour lines adjacent the trailing edge 26, in FIG. 7, the slope of the ridge 50 is steeper than that of the bulge 38. However, in other exemplary embodiments the slope can be similar to, or less than, that of the bulge 38.

Further, in an exemplary embodiment, the structure of the ridge 50 closest to the trailing edge 26 has the steepest slope, whereas as the distance from the trailing edge 26, along the platform 16, increases the slope decreases and becomes more gradual, thus providing a more gradual and smooth transition to the platform 16 surface.

The presence of the trailing edge ridge may modify the loading of the airfoil near the endwall. This modification can result in increased lift, an alteration of the horseshoe and secondary flow structures, a change in the shock structures and accompanying losses, as well as a modification of the heat transfer.

By blending a trailing edge ridge 50 into the trailing edge 26 of the airfoil 14 and the platform 16 an increase in the aerodynamic efficiency of the airfoil 14, and thus turbine as a whole, can be achieved. Namely, the trailing edge ridge 50 can act to increase the area for aerodynamic loading of the airfoil forming the airfoil 14. By adding to the area that can support loading, the operational performance of the turbine can be increased, resulting in more work being extracted from the turbine.

Stated differently, the trailing edge ridge 50, of this embodiment, can act to extend the camber line of the airfoil 14 near the endwall. Thus, additional loading beyond the trailing edge 26 can be supported. The aerodynamic effect of this additional loading acts as an overcambering of the airfoil 14, where endwall loading is reduced near mid-passage of the airfoil 14 but is increased near the trailing edge 26. Thus, near endwall velocities are slower, overturning is enhanced and the primary turbine flow shifts toward the mid-span section.

The result of this effective overcamber is a reduction in skin friction and secondary flow. Thus, an overcambering effective is achieved in the turbine without modifying the entire airfoil 14.

Additionally, the presence of the trailing edge ridge 50 allows for the manipulation of the operational thermal profile at the trailing edge 26 of the airfoil 14. This is because the modification in secondary flow (discussed above) can change or cause a reduction of convective mixing and/or heat transfer which can normally bring hot core in flow in contact with the endwalls. The trailing edge 26 of a airfoil 14 can be the location of high temperature concentrations, thus limiting structural performance of the blade and the endwall at the trailing edge 26. This aspect of the present disclosure allows for manipulation of the thermal profile via the trailing edge ridge 50. Thus, a desired thermal distribution can be attained and can be optimized, resulting in a reduction of the cooling required.

The shape and scalloped contour of the trailing edge ridge 50, whether employed in conjunction with the bulges 38 and the bowls 40, is determined to optimize performance of the blades 20 and the turbine. For example, the shape of the ridge 50 is optimized either for aerodynamic performance or durability or both, depending on the desired performance parameters and characteristics.

As shown in FIG. 7 the trailing edge ridge directly adjoins the trailing edge 26 of the airfoil 14. Further, in the embodiment shown in these figures, the trailing edge ridge 50 adjoins both the airfoil suction side 22 and the pressure side 20. In another embodiment, the trailing edge ridge 50 adjoins and extends from the trailing edge 26 as shown and adjoins only one of the pressure side 20 or the suction side 22, depending on design and operational parameters. In a further alternative embodiment, the trailing edge ridge 50 adjoins and extends from the trailing edge 26 as shown but does not adjoin either of the pressure side 20 or the suction side 22.

In a further exemplary embodiment, an additional bowl and/or bulge (not shown) is positioned on the surface 16 at some point downstream of the ridge 50. In such an embodiment, the bowl and/or bulge can aid in vortex suppression or otherwise optimizing the operational and performance parameters of various embodiments of the present disclosure.

In the embodiment shown in FIG. 7 the maximum height (i.e., positive (+) displacement above platform 16) of the trailing edge ridge 50 is at the trailing edge 26, and the height of the ridge 50 reduces as the ridge 50 extends away from the airfoil 14 surfaces. The ridge 50 smoothly transitions into the surface 16 so as to affect efficient structural and thermal load distribution. In an embodiment where the bulge 38 and the bowl 40 scalloped surfaces are present, the ridge 50 smoothly transitions to these surfaces and the reference surface as optimized for design and performance purposes.

In an embodiment, the maximum height of the trailing edge ridge 50 matches that of the bulge 38, which has a maximum height which is generally equal to the thickness of the incoming boundary layer of combustion gases 12 (see discussion previously). However, it is contemplated that based on varying operational parameters the height of the ridge 50 can be higher than, or lower than, the height of the bulge 38.

In an exemplary embodiment, as with the bulges 38 and the bowls 40, the trailing edge ridge 50 joins the root end of the airfoil 14 and trailing edge 26 with a fillet type structure suitable to provide the needed structural integrity and performance.

As discussed previously, in an embodiment, the platforms 16 are integrally joined to the root of each airfoil. Manufacturing of an embodiment with a trailing edge ridge 50 as described above can be similar to manufacturing methods discussed previously. Namely, the overall configuration of the turbine blade including its airfoil, platform, and dovetail may be cast in a conventional manner, and the scalloped platform including the ridge 50 may be integrally cast therein where feasible. Alternatively, the platforms may be cast with nominal axisymmetric platforms with locally elevated material for the ridge, which may then be machined using conventional electrical discharge machining (EDM) or electrochemical machining (ECM) for forming the 3D contour of the scalloped platform, including the final contours of the ridge. Of course, all other known and used methods of manufacturing can be employed as the various embodiments of the present disclosure are not limited in this regard.

In an exemplary embodiment, the orientation of the ridge 50 is such that it follows the mean camber line for the airfoil shape. However, the present disclosure is not limited in this regarding as the orientation and overall shape of the ridge 50 and its contour is to be optimized such that the desired operational and performance parameters are achieved. It is well within the ability of a skilled artisan to perform such optimization.

The scalloped platforms have been disclosed above for a turbine rotor, but could also be applied to a turbine nozzle. In a turbine nozzle, turbine vanes are integrally mounted in radially outer and inner endwalls or bands which are typically axisymmetrical circular profiles around the centerline axis. Both the inner and outer bands may be scalloped in a manner similar to that disclosed above for reducing the adverse affects of the corresponding secondary vortices generated at the opposite ends of the turbine nozzle vanes and increasing aerodynamic loading and efficiency while providing beneficial thermal distribution.

The scalloped platform may therefore be used for enhancing aerodynamic efficiency in any type of turbine engine, and for any type of turbine airfoil. Further examples include turbine rotor blisks in which the airfoils are integrally formed with the perimeter of the rotor disk. Low pressure turbine blades may include integral outer shrouds in which the scalloped platform may also be introduced. Further, steam turbine blades and vanes may also include the scalloped platforms at the corresponding root ends thereof. Additionally, various embodiments can be employed in other similar applications such as pumps, blowers, turbines and the like. Embodiments of the disclosure are not limited in this regard.

Modern computer fluid dynamics analysis now permits the evaluation of various permutations of the scalloped platforms for reducing vortices to increase turbine efficiency. The specific contours of the bulges, ridges and bowls will vary as a function of the specific design, but the form of the elevated bulge on the airfoil pressure side aft of the leading edge, the depressed bowl along the suction side blending with the bulge, and the ridge at the airfoil trailing edge will remain similar for specifically reducing the adverse affects of the vortices generated as the combustion gases split over the airfoil leading edges, decreased aerodynamic loading and undesirable thermal distributions.

In various embodiments, the bulges, bowls and ridges are blended with each other respectively and the airfoil via fillet structures as described herein. For example, the bulge and bowl will be blended to each other with fillets while the trailing edge ridge and the bowl are blended with each other. Of course the overall contours, blending and fillet structure can be optimized as needed.

While there have been described herein what are considered to be preferred and exemplary embodiments of the present disclosure, other modifications of the disclosure shall be apparent to those skilled in the art from the teachings herein, and it is, therefore, desired to be secured in the appended claims all such modifications as fall within the true spirit and scope of the disclosure.

The invention claimed is:

1. A turbine stage comprising:
a row of airfoils integrally joined to corresponding platforms and spaced laterally apart to define respective flow passages therebetween for channeling gases, each flow passage having a width;
each of the airfoils including a concave pressure side and a laterally opposite convex suction side extending in chord between opposite leading and trailing edges; and
at least some of the platforms having a scalloped flow surface including a bulge adjoining the pressure side and a bowl adjoining the suction side aft of the leading edge of the respective airfoils,
wherein the bulge is configured having a maximum height located within its respective flow passage, and wherein the bulge decreases in height in a forward and aft direction and decreases in height laterally toward the pressure side of the airfoil and toward the bowl adjoining the suction side of a next adjacent airfoil, and
wherein the bowl is configured having a maximum depth located within its respective flow passage and directly adjoining the suction side of the respective airfoil.

2. The turbine stage according to claim 1, wherein at least some of the platforms include a trailing edge ridge structure extending along a portion of the airfoils and coupled to the at least some platforms, the trailing edge ridge structure adjoining the pressure side, the suction side, and the trailing edge of each respective airfoil with the respective platforms.

3. The turbine stage according to claim 1, wherein the bulge and the bowl form laterally therebetween an arcuate channel extending axially along the platform between adjacent airfoils.

4. The turbine stage according to claim 1, wherein the bulge and the bowl terminate laterally in the flow passage between the trailing edges.

5. The turbine stage according to claim 1, wherein the bulge is configured having a maximum height aft of the leading edge.

6. The turbine stage according to claim 1, wherein the bulge is configured having a maximum height forward the leading edge.

7. The turbine stage according to claim 1, wherein the bulge decreases in height in a forward direction and decreases in height in an aft direction to the trailing edge.

8. The turbine stage according to claim 1, wherein the bulge decreases in height in a forward direction over a length of substantially 20% of the axial chord and decreases in height in an aft direction along an extent of the pressure side to the trailing edge.

9. The turbine stage according to claim 1, wherein the bowl decreases in depth in a forward and aft direction and laterally toward the bulge adjoining the pressure side of their respective airfoil.

10. The turbine stage according to claim 9, wherein the bowl is configured having a maximum depth near the maximum thickness of the airfoil.

11. The turbine stage according to claim 1, wherein the bulge is configured having a maximum height aft of the leading edge and the bowl is configured having a maximum depth adjoining the suction side of the airfoil near the maximum thickness of the airfoil.

12. The turbine stage according to claim 1, wherein a downstream airfoil in the row of airfoils including the bulge and the bowl is configured to accept overturned air from an upstream airfoil in the row of airfoils and minimize vortex formation about the downstream airfoil.

13. A turbine stage comprising:
a row of airfoils integrally joined to corresponding platforms and spaced laterally apart to define respective flow passages therebetween for channeling gases, each flow passage having a defined width;
each of the airfoils including a concave pressure side and a laterally opposite convex suction side extending in chord between opposite leading and trailing edges;
at least some of the platforms having a scalloped flow surface including a bulge extending along a portion of the airfoils and coupled to the at least some platforms, the bulge adjoining the pressure side of each respective airfoil with the respective platforms and a bowl extending along a portion of the airfoils and coupled to the at least some platforms, the bowl adjoining the suction side aft of the leading edge of each respective airfoil with the respective platforms,
wherein the bulge is configured having a maximum height located within its respective flow passage, and wherein the bulge decreases in height in a forward and aft direction and decreases in height laterally toward the pressure side of the airfoil and toward the bowl adjoining the suction side of a next adjacent airfoil, and
wherein the bowl is configured having a maximum depth directly adjoining the suction side of the airfoil and decreases in depth in a forward and aft direction and laterally toward the bulge adjoining the pressure side of their respective airfoil.

14. The turbine stage according to claim 13, wherein at least some of the platforms include a trailing edge ridge structure extending along a portion of the airfoils and coupled to the at least some platforms, the trailing edge ridge structure adjoining the pressure side, the suction side, and the trailing edge of each respective airfoil with the respective platforms.

15. The turbine stage according to claim 13, wherein the bulge is configured having a maximum height aft of the leading edge.

16. The turbine stage according to claim 13, wherein the bulge is configured having a maximum height forward the leading edge.

17. The turbine stage according to claim 13, wherein the bowl is configured having a maximum depth adjoining the suction side of the airfoil and decreases in depth in a forward and aft direction and laterally toward the bulge adjoining the pressure side of their respective airfoil.

18. The turbine stage according to claim 17, wherein the bowl is configured having a maximum depth near the maximum thickness of the airfoil.

19. The turbine stage according to claim 13, wherein the bulge is configured having a maximum height aft of the leading edge and the bowl is configured having a maximum depth adjoining the suction side of the airfoil near the maximum thickness of the airfoil.

20. A turbine blade comprising:
an airfoil integrally joined to a platform, and having laterally opposite pressure and suction sides extending in chord between axially opposite leading and trailing edges; and
the platform including a bulge adjoining the pressure side, a first bowl portion adjoining the suction side aft of the leading edge, and a second bowl portion integrally formed with the bulge on the pressure side and being complementary with the first bowl portion to define therewith on an adjacent blade, a collective bowl,
wherein the bulge is configured having a maximum height located within its respective flow passage, and wherein the bulge decreases in height in a forward and aft direction and decreases in height laterally toward the pressure side of the airfoil and toward the bowl adjoining the suction side of a next adjacent airfoil, and
wherein the first bowl portion is configured having a maximum depth directly adjoining the suction side of the airfoil and decreases in depth in a forward and aft direction and laterally toward the bulge adjoining the pressure side of their respective airfoil.

21. The blade according to claim 20, wherein the platform further includes a trailing edge ridge structure extending along a portion of the airfoil and coupled to the platform, the trailing edge ridge structure adjoining the pressure side, the suction side, and the trailing edge of the airfoil with the platform.

* * * * *